United States Patent [19]

Kale

[11] 4,095,352
[45] Jun. 20, 1978

[54] CHIROPRACTIC TRAINING DEVICE

[76] Inventor: Michael U. Kale, Rte. 6, Spartanburg, S.C. 29303

[21] Appl. No.: 718,187

[22] Filed: Aug. 27, 1976

[51] Int. Cl.² ............................................. G09B 23/28
[52] U.S. Cl. ........................................................ 35/17
[58] Field of Search ................. 35/17; 46/1 A; 73/13; 273/58 H

[56] References Cited

U.S. PATENT DOCUMENTS

| | | | |
|---|---|---|---|
| 1,829,968 | 11/1931 | Smith | 35/17 |
| 2,045,812 | 6/1936 | Upson | 35/17 |
| 2,054,996 | 9/1936 | Upson | 35/17 X |
| 2,451,200 | 10/1948 | Church | 35/17 |
| 2,664,077 | 12/1953 | Moore | 46/1 A UX |
| 3,401,471 | 9/1968 | Hesse | 35/17 |

FOREIGN PATENT DOCUMENTS 1,315,425 10/1962 France ............................. 273/58 H

*Primary Examiner*—Harland S. Skogquist
*Attorney, Agent, or Firm*—Luke J. Wilburn, Jr.; Wellington M. Manning, Jr.

[57] ABSTRACT

Method and apparatus for training or teaching students and practitioners of chiropractic to properly apply force by hand to adjust the joints of the human body, especially the vertebrae of the spine. The device comprises a base member having an arm member pivotally hinged thereto for movement toward and away from the base member. Compression springs positioned between the arm and base members provide a resistive force to movement of the arm toward the base and means are provided on the arm member to receive a fracturable or deformable object having a force to fracture at low velocity which is substantially less than the force required to compress the springs. The user of the device attempts to move the arm toward the base and into a locked position against the force of the springs by applying a high speed force by hand against the fracturable or deformable object. The fracturable or deformable object may also be rotated by hand on the arm during application of force to teach multidirectional application of force during compression of the springs.

3 Claims, 3 Drawing Figures

CHIROPRACTIC TRAINING DEVICE

The present invention relates to method and apparatus for use in the field of chiropractic and, more particularly, to an improved method and training device for teaching proper application of force by hand to the human body in chiropractic adjustment or manipulation of the spine.

As is known, the field of chiropractic involves a system or practice of adjusting the joints, especially of the spine, of the human body by hand for the curing of disease. The practitioner of chiropractic must be skilled in and have an intimate knowledge of how to properly apply force by hand to outer surfaces of the body for adjustment or manipulation of the vertebrae, including the occiput and illium.

In the past, students of chiropractic have used a training device to teach the application of hand force through a precise distance, or depth of movement, in manipulation or adjustment of the vertebrae. Such device consists of a base member having a moveable arm member pivotally attached thereto and compression springs located between the base and arm to position the arm at a selected distance from an arm stop member on the base. In use of the device, the palm of one hand is placed on the upper surface of the free end of the arm member with the other hand gripping the wrist. A force is then applied to move the arm member toward the base against resistance of the springs. A spring-loaded latch device is positioned along the path of movement of the arm just before the stop member to catch the arm member and prevent its upward movement by the springs when hand pressure is removed therefrom. Thus, by locating the upper position of the arm at a distance from the latch device which is equal to the desired distance through which force should be applied to properly adjust the vertebrae, the student practices to learn to apply force to the arm so that the arm is engaged by the latch without contacting the arm stop member. Thus the device, when properly operated, teaches the student to accurately control the depth, or distance, through which force should be applied for vertebral adjustment.

Although practice with the above described device can teach the proper distance through which force should be applied, there are other factors which are important in adjustment of the vertebrae by hand force. To adjust the vertebrae without undue patient discomfort and to reposition a vertebra in its normal alignment, hand force should be applied at a high speed with a quick release motion. In addition, it is often necessary in vertebral adjustment to rotate the hand during application of force to produce multi-directional force components on the vertebra to properly reposition it in the spinal column.

It is therefore an object of the present invention to provide an improved chiropractic training device and method which enables the student or practitioner to not only become proficient in applying force through a proper distance, but also to learn to apply the force with a quick, high speed motion and in desired directions relative to the spine.

It is another object of the present invention to provide a chiropractic training or teaching device for teaching proper direction, speed and distance of application of force which is quite inexpensive, is easily constructed, and thus is readily available to all students and practitioners of chiropractic for achieving and maintaining proficiency in their field.

Briefly stated, the present invention is directed to an improved training and teaching device of the general type described above wherein the prior device is modified by provision of means for receiving a fracturable or deformable object on the upper surface of the moveable arm member. In use of the device, hand force is applied to the fracturable object to move the arm into locked position without fracturing or deforming the object. By utilizing an object having a force of fracture at low velocity which is considerably less than the force required to compress the springs to lock the moveable arm, the user of the device is taught to apply pressure with the proper high velocity or speed which is desirable to properly relocate the vertebra in the spinal column with minimum discomfort to the patient. In addition, by utilizing a fracturable or deformable object which may be rotated by the hand during application of force, the user is taught to apply a rotational force with the palm of the hand to produce a multi-directional force which is often desirable in proper relocation of vertebra in the spinal column. The use of a fracturable object also gives more positive indication to the user that the moveable arm does not strike or engage the arm stop member during the locking operation.

The invention will be better understood and the above as well as the other objects of the invention will become more apparent from the following detailed description of preferred embodiments of the invention, when taken in conjunction with the accompanying drawings, in which FIG. 1 is a perspective view of a preferred form of teaching device of the present invention;

Figure 1:
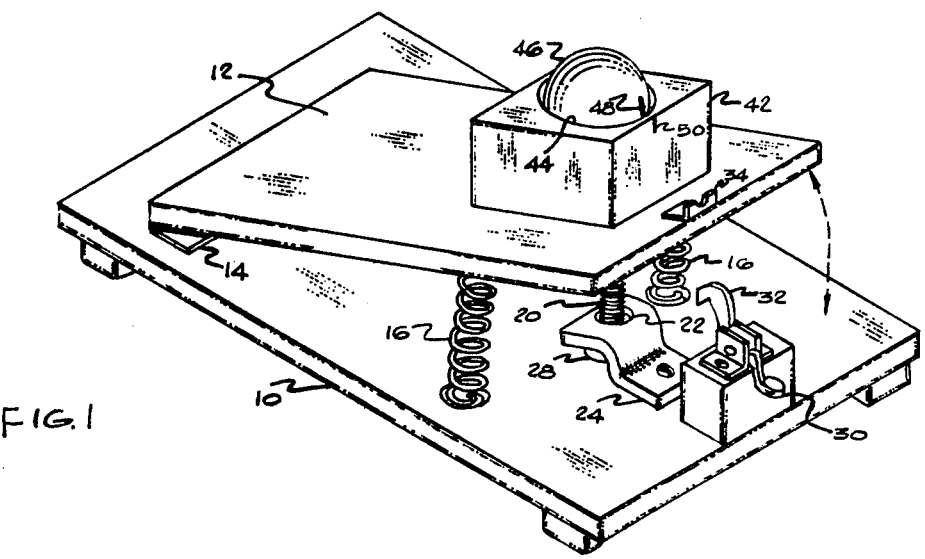
Figure 2:
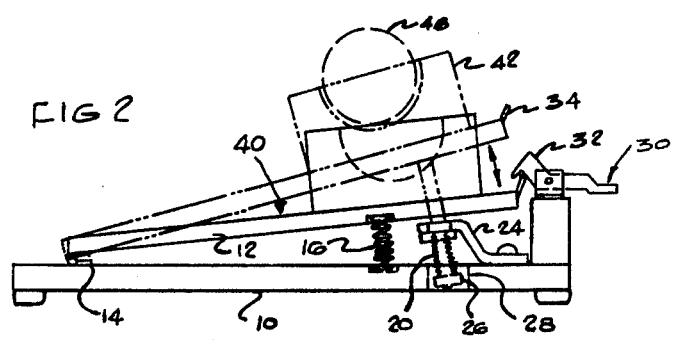
FIG. 2 is a side elevation view of the embodiment of FIG. 1.

Referring more specifically to the drawings, the training device of the present invention as shown in FIGS. 1 and 2 comprises a base member, or plate, 10, and a moveable member, or plate, 12, which is pivotably attached at one end by a hinge 14 to the base plate. Positioned between the base plate and moveable plate are resiliently deformable means, such as a pair of compression springs 16, which urge the outer end of the moveable plate 12 away from contact with the base plate.

Attached to the center portion of the bottom of moveable plate 12 adjacent the free end thereof is a threaded bolt 20 which extends through an opening 22 in an upstanding stop bracket 24 attached to the upper surface of base plate 10. Threaded bolt 20 carries an internally threaded nut 26 which engages the undersurface of the bracket 24 and which may be adjusted to establish an upper limit of travel of plate 12 against the force of springs 16. The position of the nut may be adjusted along the bolt by way of an access hole 28 in base plate 10.

Attached to the front of the base plate 10 is conventional spring-loaded latch element 30, the hook portion 32 of which is positioned in the path of travel of a latch hook-receiving element 34 on the end of moveable plate 12. Upon application of a downward force on the moveable plate 12 against the resistance of compression springs 16, the free end of the plate moves in a downward arc along a predetermined path until its downward movement is stopped by contact with the upper surface of bracket 24.

As best seen in FIG. 2, hook of latch element 30 is positioned along the path of movement of plate 12 so that it engages element 34 to lock plate 12 against upward movement just before the plate engages stop bracket 24. Thus, by adjusting nut 26 on bolt 20 to establish a desired distance of travel of the plate 12 from uppermost position as seen in FIG. 1 (shown in broken lines in FIG. 2) to latch engagement position 40 (FIG. 2), the student or practitioner learns to apply force through this exact distance by repeatedly pressing the moveable plate to latch it against upward movement without letting the plate contact the stop bracket 24.

As seen in FIGS. 1 and 2, positioned on the upper surface of the moveable member is a block 42 having an upwardly facing cavity 44, shown in FIGS. 1 and 2 as being of substantially semispherical shape, for supportably receiving a fracturable or deformable object, shown as a thin-walled, plastic hollow ball 46 partially filled with a liquid.

The deformable or fracturable object is constructed in such a manner that it has a force of deformation or fracture under low velocity which is substantially less than the force required to compress springs 16 and locate plate 12 in the locked position 40. However, the fracturable or deformable object must be such that under a relatively high velocity aplication of force to the object by the hand, the object will exhibit characteristics of incompressibility and thus permit transferrance of sufficient force through the object to the plate 12 to move plate into locked position without fracturing or deforming the object. It has been found that hollow objects which are partially filled with liquid will exhibit such characteristics. As an example, a chicken egg will exhibit such characteristics. The exact construction of the hollow object, e.g., its size, the thickness of the walls, the amount of liquid contained therein, the type of material employed in the construction, may be varied depending upon the force required to compress the springs and plate 12 to locked position.

Thus, in operation of the device, if force is applied relatively slowly against the ball in the cavity to compress the springs and latch the plate 12, the ball will be deformed or fracture before the plate can be latched. Similarly, if the plate 12 sharply engages the stop bracket 24 during the latch operation, the ball will likewise fracture or deform. Thus the plate 12 can only be latched by a very quick acceleration and release of hand pressure without striking the stop bracket to avoid deformation or fracture of the ball.

As best seen in FIG. 1, ball 46 has an indicator mark 48 which is aligned with an indicator mark 50 on block 42 when the ball is placed in the cavity. During practice with the device, the student or practitioner applies a force with the palm of the hand on the ball while quickly rotating the hand to cause the ball to rotate in cavity 44. When the user can learn to rotate the ball about the cavity through a distance of between 180° to 360° during each latching of the plate 12 without deforming or breaking the ball, proper multi-directional forces are being applied with the hand through the proper distance.

For an impressive demonstration of use of the device to teach high velocity application of force by hand through a proper distance, a chicken egg may be employed as the fracturable object.

Figure 3:
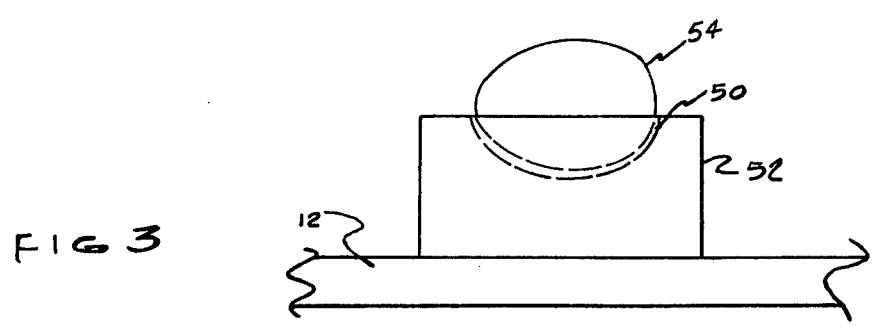
FIG. 3 is a side elevation view of a portion of a modified form of the device shown in FIGS. 1 and 2.

FIG. 3 shows a modified form of cavity 50 in a block 52, which cavity is semi-ovoidal in shape to supportably receive a chicken egg 54.

Although the preferred form of the invention has been described with reference to the provision of a block member having a semispherical or semi-ovoidal shaped cavity for reception of the fracturable or deformable object, it should be understood that the fracturable object may take other shapes or forms and the means for receivably supporting the object on the upper surface of the arm member may vary, depending on the particular shape of the object employed.

That which is claimed is:

1. An improved device for teaching proper application of force to the human body in chiropractic manipulation of the joints comprising a base member, a moveable member operatively connected to said base member for movement toward and away from said member along a predetermined path of travel, force-imparting means operatively associated with said members for continuously urging said moveable member away from said base member during its movement along said path of travel, means operatively associated with said members and defining opposite ends of said path of travel of said moveable member toward and away from base member, releasable locking means for engaging said moveable member at a position along said path of travel which is closely adjacent the end of said path of travel toward said base member to prevent its movement away from said base member, and a fracturable or deformable object supportably received on said moveable member for engagement by the hand for application of force thereto to move said moveable member, said object having a force of fracture or deformation under low velocity which is less than the force of said force-imparting means and having a force of fracture or deformation under high velocity which is greater than the force of said force-imparting means, whereby application of force to said object under high velocity is transmitted therethrough to said moveable member to move said member toward said base member and into engagement with said locking means deformation or fracture of said object.

2. A method for teaching the application of force by hand to the human body in chiropractic manipulation of the joints comprising the steps of:
   a. engaging a fracturable or deformable object with the palm of the hand and,
   b. applying force by hand against said object move said object for a predetermined distance along a predetermined path of travel against a relative force which is greater than the force of fracture of said object at low velocity, without fracturing or deforming said object.

3. An improved device for teaching proper application of force to the human body in chiropractic manipulation of the joints comprising:
   a. base member;
   b. a moveable member including a plate operatively connected to said base member for movement toward and away from said base member along a predetermined path of travel;
   c. force-imparting means operatively associated with said members for continuously urging said moveable member away from said base member during its movement along said path of travel;
   d. means operatively associated with said members and defining opposite ends of said path of travel of said moveable member toward and away from said base member;

e. releasable locking means for engaging said moveable member at a position along said path or travel which is closely adjacent the end of said path of travel toward said base member to prevent its movement away from said base member;

f. said moveable member including a block member mounted on the upper surface of said plate and having a generally semispherical cavity therein; and g. a generally spherical ball positioned in said cavity and having a surface portion for engagement by the palm of the hand to apply force against said ball to move said moveable member along said path of travel towards said base member for engagement by said releasable locking means, said ball being of hollow construction and partially filled with a liquid, said ball including an indicator mark on the outer surface thereof, and an indicator mark on said block member adjacent said cavity for alignment with said indicator mark on said ball when the ball is supportably positioned in said cavity.

* * * * *